UNITED STATES PATENT OFFICE.

ACTAEON L. DYKE, OF AKRON, OHIO.

PROCESS OF COLORING MARBLES.

SPECIFICATION forming part of Letters Patent No. 439,031, dated October 21, 1890.

Application filed May 5, 1890. Serial No. 350,679. (No specimens.)

*To all whom it may concern:*

Be it known that I, ACTAEON L. DYKE, of Akron, in the county of Summit and State of Ohio, have invented a certain new and useful Improved Process of Coloring Marbles; and I do hereby declare the following to be a full, clear, and exact description of the invention, such as will enable others skilled in the art to which it pertains to make and use the same.

My invention relates to an improved process of coloring marbles; and it consists in the steps hereinafter described and claimed.

The marbles are first glazed in the usual manner. Next a small quantity of coloring material is placed in the bottom of a pan or other suitable preferably flat-bottomed vessel, the coloring material being more or less distributed over the bottom of the vessel. Next a quantity of marbles is placed in the vessel, not enough to cover the bottom thereof, but leaving room for the marbles to roll about quite freely. The vessel is then shaken, usually by hand, to roll the marbles in different directions in the vessel. This movement, owing to the limited quantity of the coloring material, only colors the marbles in patches, leaving a considerable portion of the surface of the marbles with the glazing exposed. The coloring material dries quickly, and the rolling of the marbles in the vessel is continued until the colors are sufficiently set so that the marbles may be emptied out onto a table or into another vessel. The marbles are then placed in a second and similar vessel provided with a limited amount of coloring material of a different color. The second vessel is then shaken in like manner to roll the marbles in like manner therein to take up the second color. Preferably primary colors—red, blue, and yellow—are employed, and we will suppose that the first color was yellow and the second color was blue. The second color will of course more or less cover the first color, and the two colors in the supposed case would produce green. At the end of the second shaking the marbles will present a beautiful variegated appearance, the glazing and the colors blue, green, and yellow appearing in a great diversity of form, and likely no two marbles will have the same appearance. If the primary colors employed are red and yellow, an orange color may be produced where the colors overlap, and purple may be produced by using blue and red.

If three batches of marbles are prepared, the one using red and yellow and the other batch using red and blue and for the third batch using blue and yellow, and the three batches are afterward mixed, the beauty and diversity of the marbles in the aggregate will be quite surprising. The process is quite inexpensive, so far as the amount of labor required, as one man can color many bushels of marbles per day.

What I claim is—

The process of ornamenting marbles, consisting, essentially, in rolling the marbles in a vessel having therein a limited amount of coloring-matter, so as to partly color the marbles, and then placing them in another vessel having therein a limited amount of coloring-matter, substantially as set forth.

In testimony whereof I sign this specification, in the presence of two witnesses, this 18th day of April, 1890.

ACTAEON L. DYKE.

Witnesses:
JOHN DORAN,
F. H. WATERS.